(12) United States Patent
Yang

(10) Patent No.: US 11,603,047 B2
(45) Date of Patent: Mar. 14, 2023

(54) ROOF PANEL STRUCTURE

(71) Applicant: FORMOSA SAINT JOSE CORPORATION, Taipei (TW)

(72) Inventor: Ming-Shun Yang, Taipei (TW)

(73) Assignee: FORMOSA SAINT JOSE CORP., Taipei (TW)

( * ) Notice: Subject to any disclaimer, the term of this patent is extended or adjusted under 35 U.S.C. 154(b) by 77 days.

(21) Appl. No.: 17/356,978

(22) Filed: Jun. 24, 2021

(65) Prior Publication Data

US 2021/0387575 A1 Dec. 16, 2021

Related U.S. Application Data

(63) Continuation-in-part of application No. 16/771,913, filed on Jun. 11, 2020, now abandoned.

(51) Int. Cl.
*B60R 9/045* (2006.01)
*B60R 9/048* (2006.01)

(52) U.S. Cl.
CPC .............. *B60R 9/045* (2013.01); *B60R 9/048* (2013.01)

(58) Field of Classification Search
CPC .. B60R 9/045; B60R 9/08; B60R 9/12; B60R 9/048; B60R 2011/0082
USPC ....................... 224/320–321, 42.34, 549, 552
See application file for complete search history.

(56) References Cited

U.S. PATENT DOCUMENTS

| | | | | |
|---|---|---|---|---|
| 2,663,472 A * | 12/1953 | Belgau | ..................... | B60R 9/058 224/330 |
| 2,754,041 A * | 7/1956 | Etienne | .................... | B60R 9/055 224/325 |
| 3,002,664 A * | 10/1961 | Guevara | ................. | B60R 9/045 224/314 |
| 3,232,502 A * | 2/1966 | Kleinbortas | ............ | B60R 9/045 224/314 |
| 4,632,289 A * | 12/1986 | Morissette | .............. | B60R 9/045 224/314 |
| 5,096,106 A * | 3/1992 | Foster | ..................... | B60R 9/045 16/349 |
| 5,749,436 A * | 5/1998 | Satchwell, III | ......... | B60R 3/005 211/195 |
| 7,798,381 B2 * | 9/2010 | Moreau | ................... | B60R 9/045 224/314 |

(Continued)

*Primary Examiner* — Scott T McNurlen
(74) *Attorney, Agent, or Firm* — Ian B. Oglesby

(57) ABSTRACT

The present invention discloses multipurpose roof panel structures formed by strong material. One roof panel includes a base panel and two movable barrier rods fixed on the base panel, said movable barrier rods are fixed on the two opposite sides of the base panel and can be inclined raised above or set flat adjacent to the base panel. The other roof panel includes a base panel, two movable barrier rods and plural fixing planks, wherein each movable barrier rod, being fixed on the two opposite sides of the base panel, is being inclined raised above the base panel and secured by at least a fixing plank, or being set flat resting adjacent to the base panel and secured. With the implementation of the present invention, the movable barrier rods are either raised to securely contain and protect objects or luggage, or set flat to have more space to contain and protect larger or longer objects such as ski board or surfboard, and thus make the roof panel structures multipurpose roof panel structures.

6 Claims, 16 Drawing Sheets

(56) References Cited

U.S. PATENT DOCUMENTS

2004/0195866 A1* 10/2004 Fin .................... B60R 9/045
                                                              296/210
2012/0074187 A1* 3/2012 Gobart ............... B60R 9/045
                                                              224/321

* cited by examiner

ROOF PANEL STRUCTURE

This application is a continuation-in-part application of prior application Ser. No. 16/771,913, filed Jun. 11, 2020.

BACKGROUND OF THE INVENTION

1. Technical Field

The present invention relates to panel structures, and more particularly, to roof panel structures each contains at least one movable barrier rod.

2. Description of Related Art

Roof panels or roof top compartment are widely used to help carrying luggage or objects, especially when there are too many of them or just inconvenient to put them inside a car.

The roof panels for cars nowadays are generally fixed frames with or without raised sides that provide limited containing usage. As it is often impossible to carry a variety of objects large or long in size or shape, such as ski boards, surf boards or large size instruments, in a roof panel, replacing it with a bigger one or disassembling a part of it becomes necessary and is the only solution till now.

When every known existing roof panels are so very difficult in assembling or disassembling or to be fixed firmly on the car roof by the users, and are also apt to vibration or wind that often cause loosening of cargo in driving to endanger passengers in the car or people and cars on the road, the imperative need for innovative roof panel designs that apply to almost all cars to contain and securely protect objects of different size or shape with movable barrier rods is thus quite obvious.

SUMMARY OF THE INVENTION

The present invention discloses multipurpose roof panel structures formed by strong material. One roof panel includes a base panel and two movable barrier rods fixed on the base panel, said movable barrier rods are fixed on the two opposite sides of the base panel and can be inclined raised above or set flat adjacent to the base panel. The other roof panel includes a base panel, two movable barrier rods and plural fixing planks, wherein each movable barrier rod, being fixed on the two opposite sides of the base panel, is being inclined raised above the base panel and secured by at least a fixing plank, or being set flat resting adjacent to the base panel and secured. With the implementation of the present invention, the movable barrier rods are either raised to securely contain and protect objects or luggage, or set flat to have more space to contain and protect larger or longer objects such as ski board or surfboard, and thus make the roof panel structures multipurpose roof panel structures.

The present invention provides a multipurpose roof panel structure, made by a rigid material, comprising: a base panel; and two barrier rods, wherein one end of each barrier rod is combined separately to the base panel at each side, and wherein the barrier rods are movable barrier rods in a way that each of the said barrier rods is being inclined raised above the base panel or being set flat resting adjacent to the base panel.

The present invention also provides a multipurpose roof panel structure, made by a rigid material, comprising: a base panel; two barrier rods, wherein one end of each barrier rod is combined separately to the base panel at each side, and wherein the barrier rods are movable barrier rods in a way that each said barrier rod is being inclined raised above the base panel or being set flat resting adjacent to the base panel; and plural fixing planks, each fixing plank being rotated raised and fixed on the base panel, or being rotated flat and fixed adjacent to the base panel, wherein a first securing clip being formed on one end of each fixing plank.

Implementation of the present invention at least involves the following inventive steps:

1. The barrier rods can be inclined raised to firmly contain and well protect bags, luggage or cargos.
2. The barrier rods can be lowered flat to contain long objects or large size objects such as ski boards or surf boards.
3. Each barrier rods, either raised above or set flat adjacent to the base panel, can be firmly fixed on or adjacent to the base panel.

The features and advantages of the present invention are detailed hereinafter with reference to the preferred embodiments. The detailed description is intended to enable a person skilled in the art to gain insight into the technical contents disclosed herein and implement the present invention accordingly. In particular, a person skilled in the art can easily understand the objects and advantages of the present invention by referring to the disclosure of the specification, the claims, and the accompanying drawings.

BRIEF DESCRIPTION OF THE SEVERAL VIEWS OF THE DRAWINGS

The invention as well as a preferred mode of use, further objectives and advantages thereof will be best understood by reference to the following detailed description of illustrative embodiments when read in conjunction with the accompanying drawings, wherein.

DETAILED DESCRIPTION OF THE EMBODIMENTS OF THE INVENTION

Embodiments with illustrating graphs are provided hereafter for further understanding and recognizing of the realization of the present invention.

Figure 1:
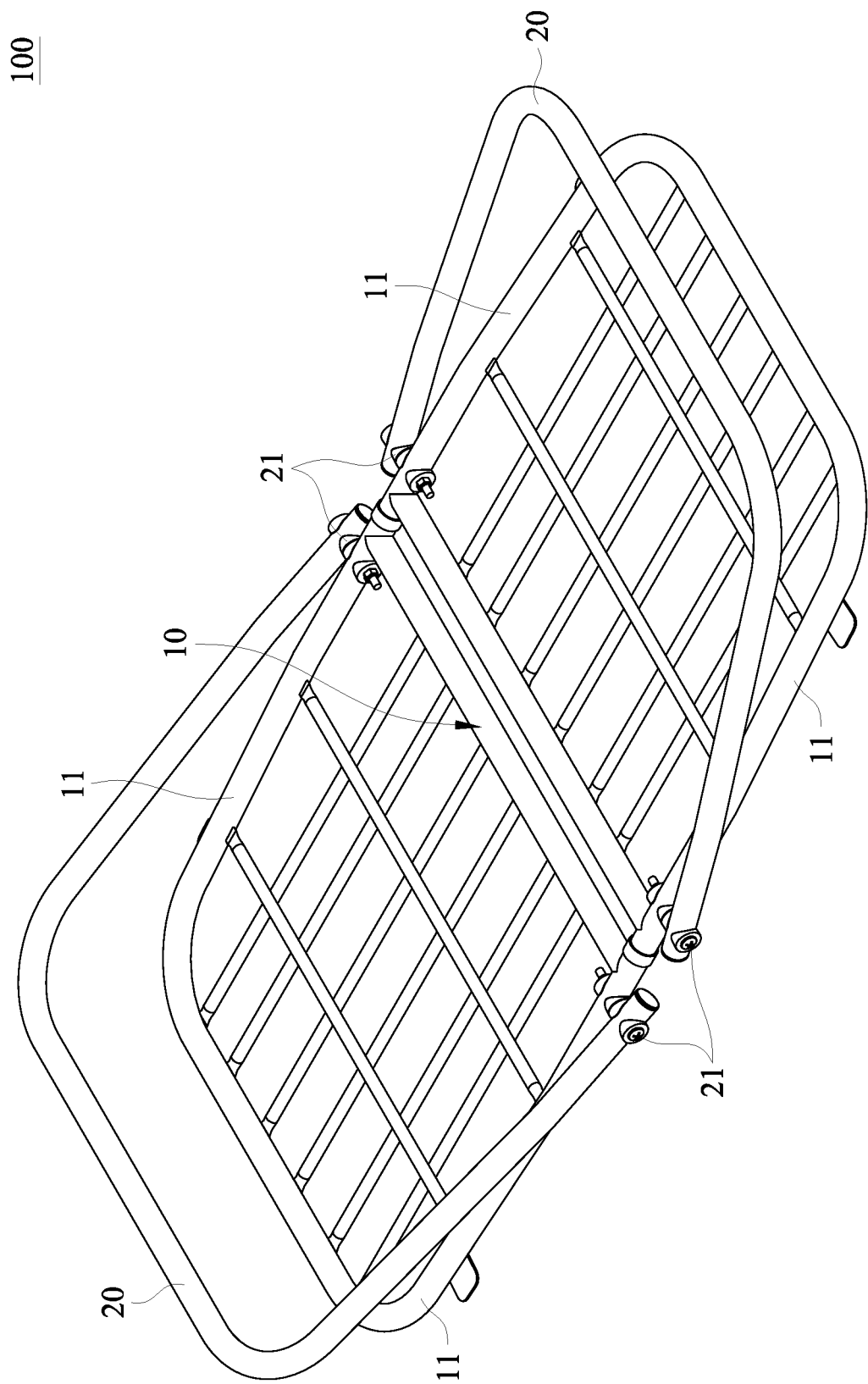
FIG. 1 is a schematic three-dimensional view of a roof panel structure according to an embodiment of the present invention.

Please refer to FIG. 1, in an embodiment of the present invention, a multipurpose roof panel structure 100 is provided to be used on a car roof to securely contain and protect objects, wherein said roof panel structure 100 includes a base panel 10 and two barrier rods 20.

Figure 5:
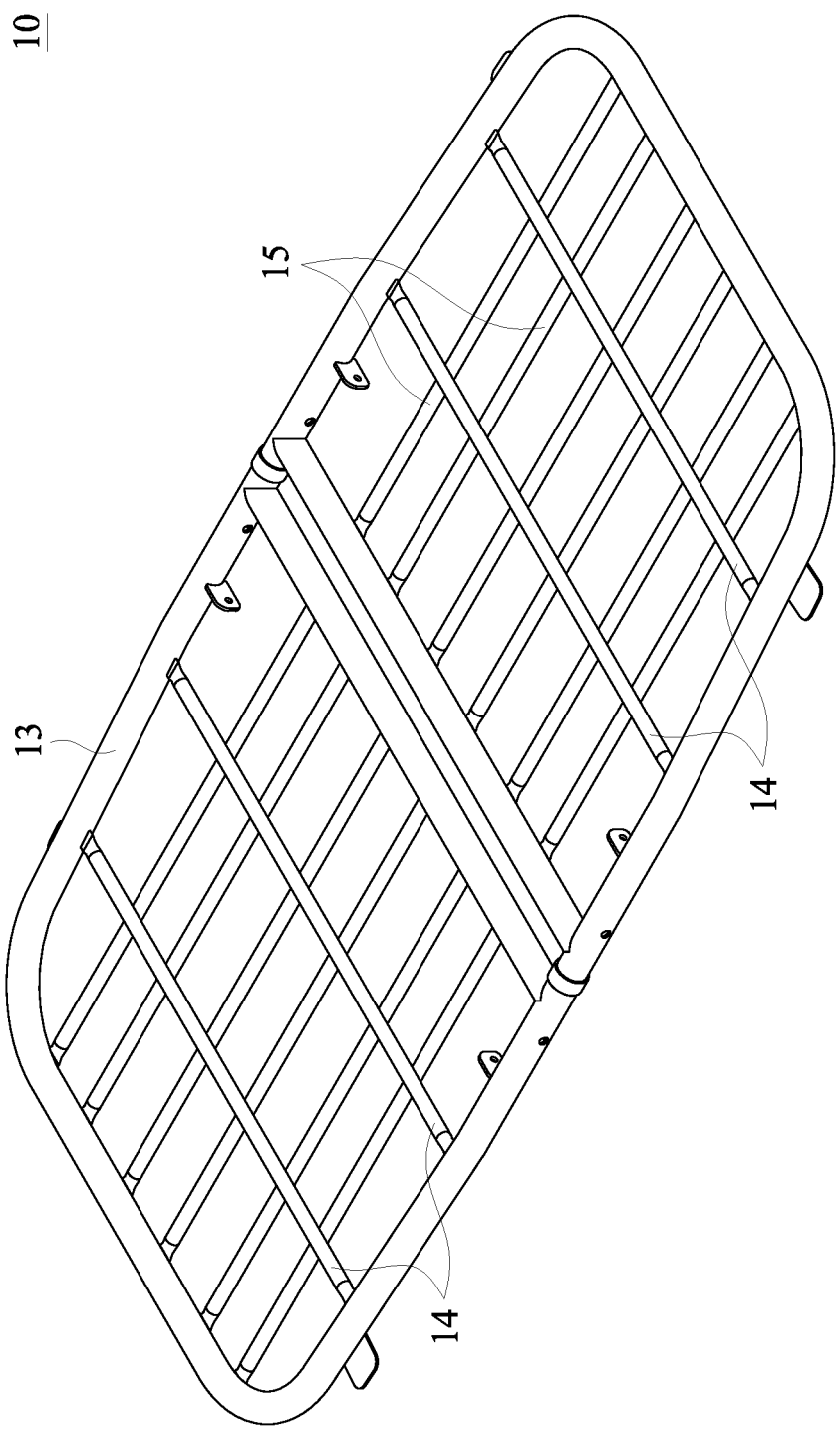
FIG. 5 is a schematic three-dimensional view of a base panel according to an embodiment of the present invention.

As shown in FIG. 1 and FIG. 5, when made of rigid materials, the base panel 10 can be a frame 13 which is a fixed combination of plural horizontal bars 14 and plural vertical bars 15. While in other embodiments, the base panel 10 can also be a plate or a board.

Figure 6:
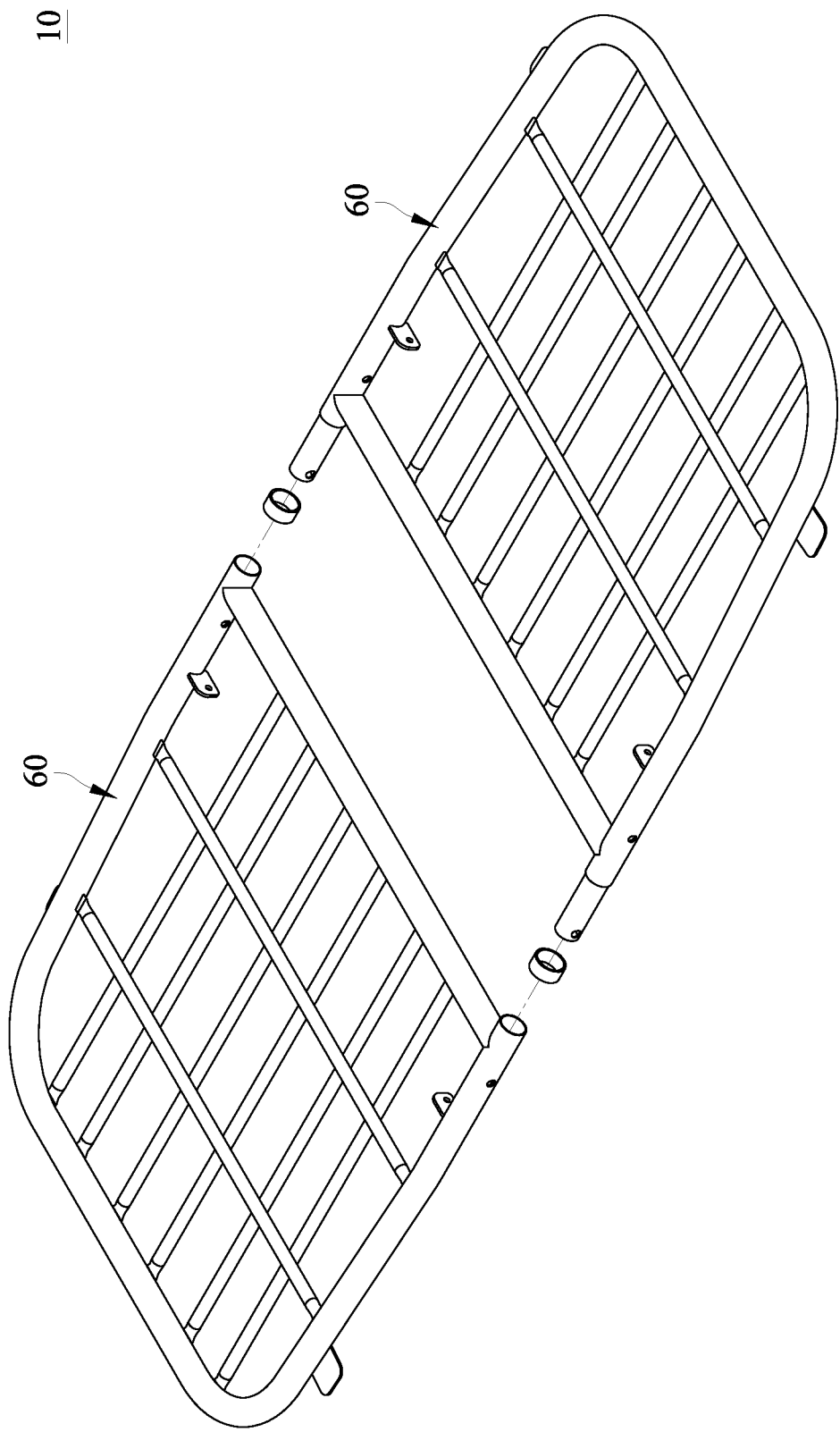
FIG. 6 is a schematic three-dimensional view of a base panel being composed of at least two separate parts according to an embodiment of the present invention.

Further, as also shown in FIG. 1 and FIG. 6, the base panel 10 of the roof panel structure 100 in an embodiment can be composed of at least two separate parts 60 for easiness and safety of storage or transportation, as well as for prevention of collision when in storage or in transportation.

Figure 3:
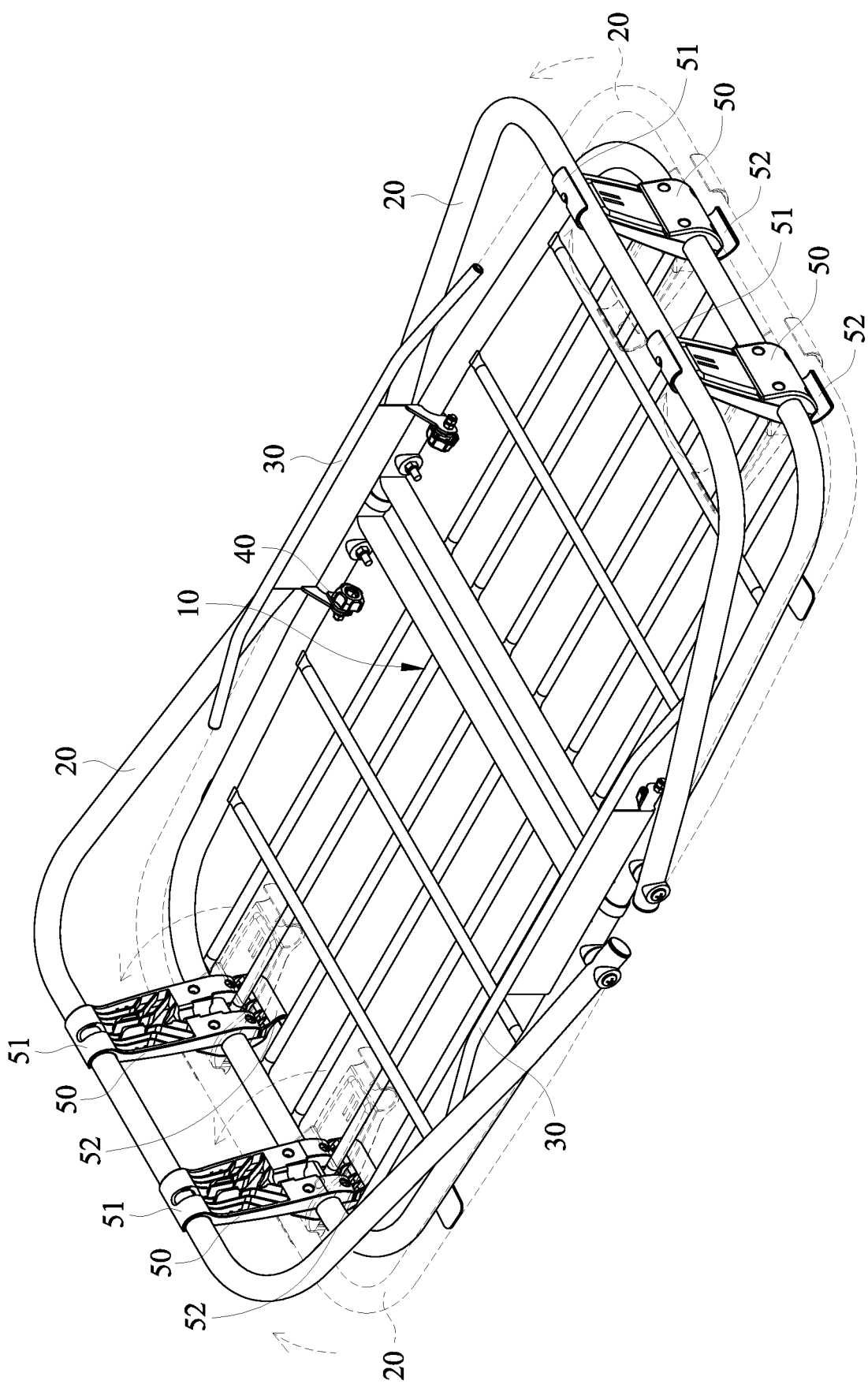
FIG. 3 is a schematic three-dimensional view of a roof panel structure further includes plural fixing planks according to an embodiment of the present invention.

As then shown in FIG. 1 and FIG. 3, two barrier rods 20 are firmly fixed on a pair of opposite sides 11 of the base panel 10 in the embodiment, wherein one end 21 of each barrier rod 20 is combined separately to the base panel 10 at each side 11, that is, each barrier rod 20 is fixedly connected to the base panel 10 with its two ends 21 at two different sides 11 of the base panel 10.

Besides, the barrier rods 20 are movable barrier rods 20 such that each of said barrier rod 20 is either inclined raised above the base panel 10 or being set flat resting adjacent to the base panel 10. And wherein said opposite sides 11 are normally the long pair of sides of the base panel 10, and the position where the barrier rods 20 fixed to the base panel 10 can be on the opening outside surface of each side 11 of the base panel 10.

Moreover, there is no particular limitation for the choice of the material for said barrier rods 20, light weight and rigid materials such as aluminum, alumina alloy or aluminum-magnesium alloy can normally be used, while in some applications, the material of the barrier rods 20 can be chosen to be same as the material of the base panel 10 for simpler preparation or storage of materials.

There is neither particular limitation for the shape of the barrier rods 20. In the embodiments shown, each barrier rod 20 can be a U-shaped rod fixed to the opening outside surface of each side 11 of the base panel 10 for ease of implementation.

Figure 2A:
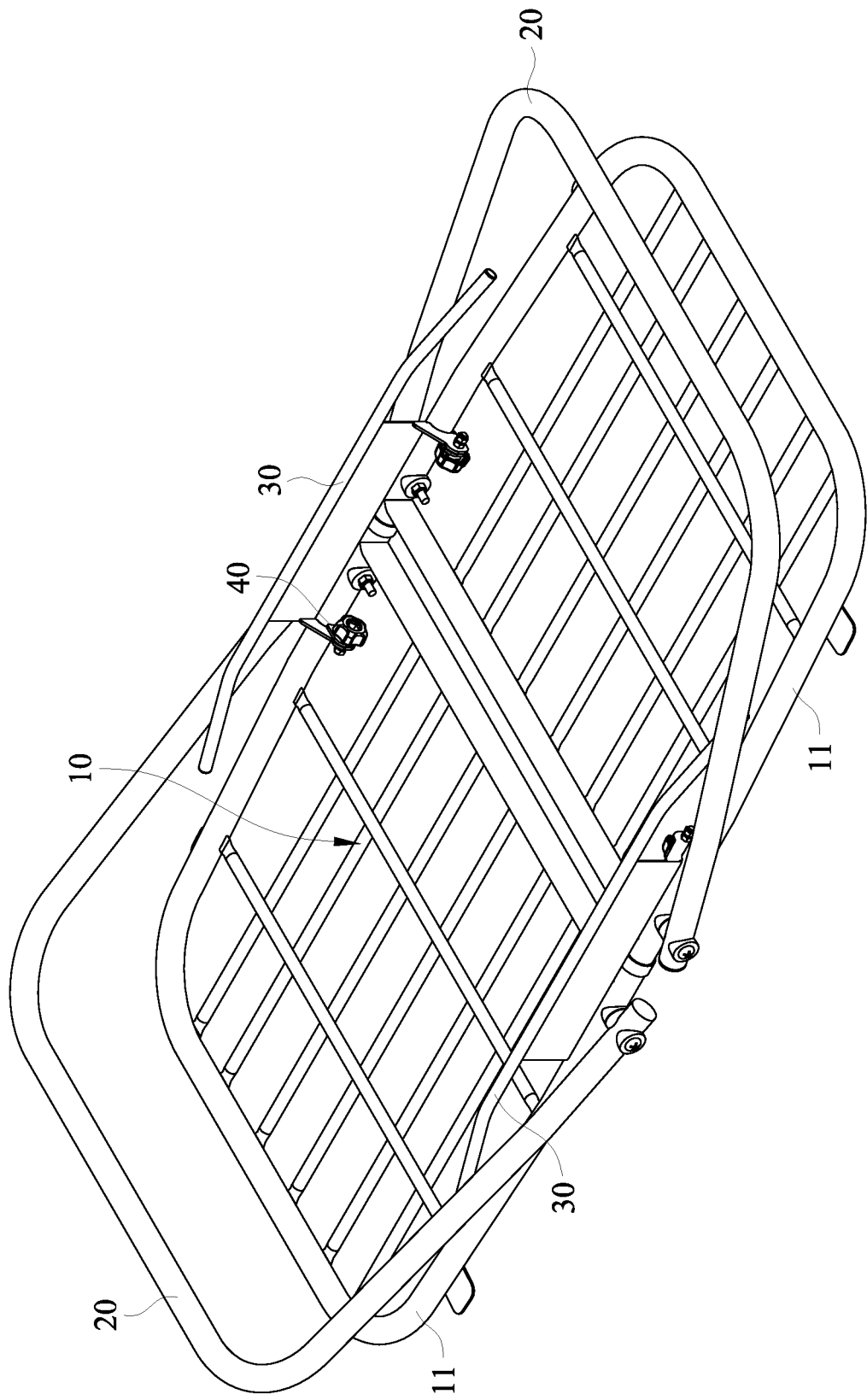
FIG. 2A is a schematic three-dimensional view of a roof panel structure further includes two barrier bars according to an embodiment of the present invention.
Figure 2B:
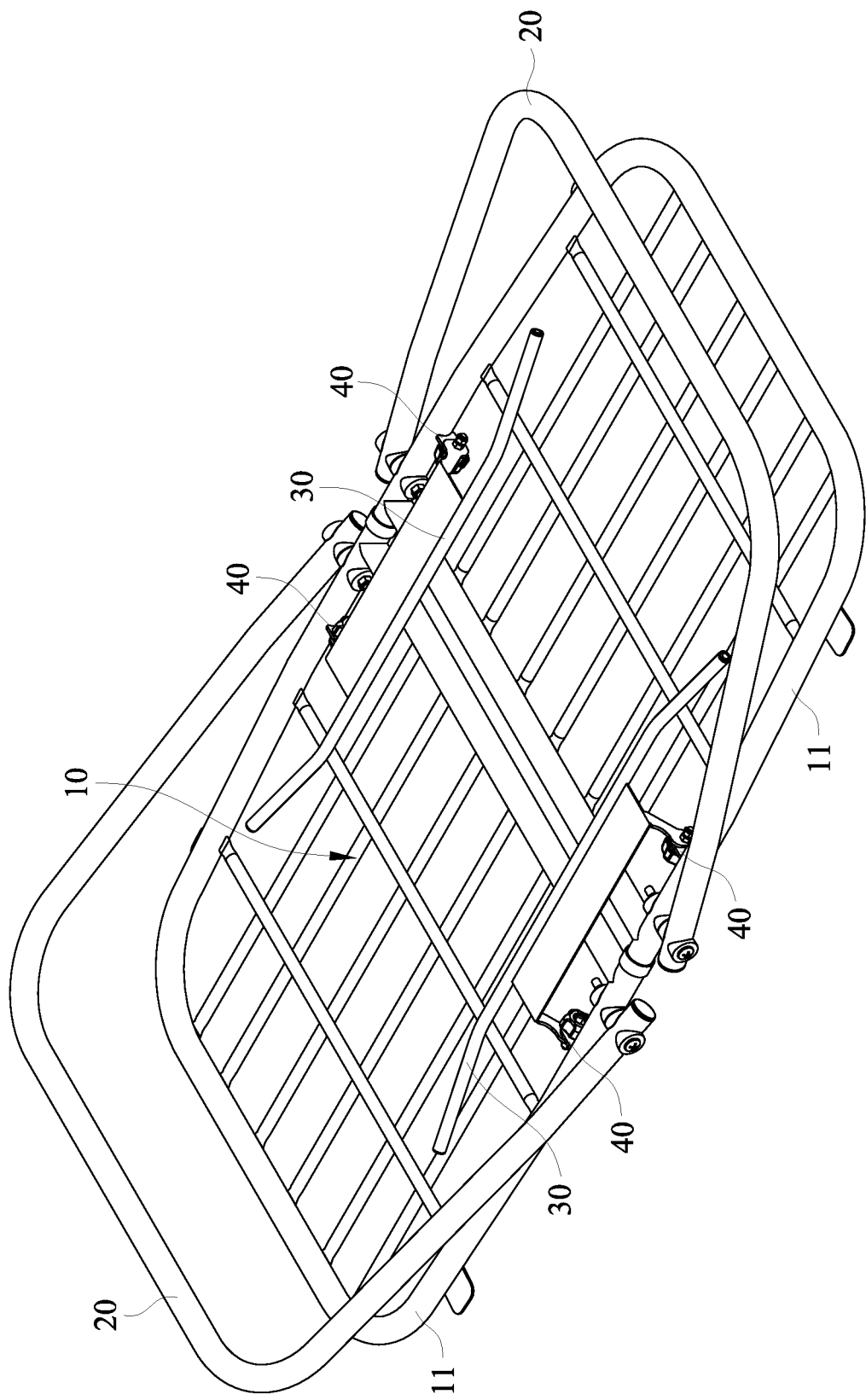
FIG. 2B is another schematic three-dimensional view of a roof panel structure that includes two barrier bars according to an embodiment of the present invention.

Please then refer to FIG. 1, FIG. 2A and FIG. 2B, the roof panel structure 100 can further comprises two barrier bars 30, each being firmly attached to one side 11 of the base panel 10 with a rotation unit 40 on the side 11. Being with no limitation to the size or shape, the barrier bars 30 can be arc shape, curved shape, polygonal shape, irregular shape, or other shapes made for various applications, besides, the forming material of each barrier bar 30 can be made same as the base panel 10 or the barrier rods 20 in some embodiments.

As shown in FIG. 2A and FIG. 2B, each barrier bar 30 fixed to the rotation unit 40 can rotate on the rotation unit 40 to either rise on the side 11 or set flat resting on the base panel 10. Said rotation unit 40 can be fixed to the base panel 10 with at least one screw set, by welding or by riveting, and each rotation unit 40 also locks a barrier bar 30 in position with proper automatic locking means when the barrier bar 30 being either raised on the side 11 or set flat on the base panel 10.

Figure 4:
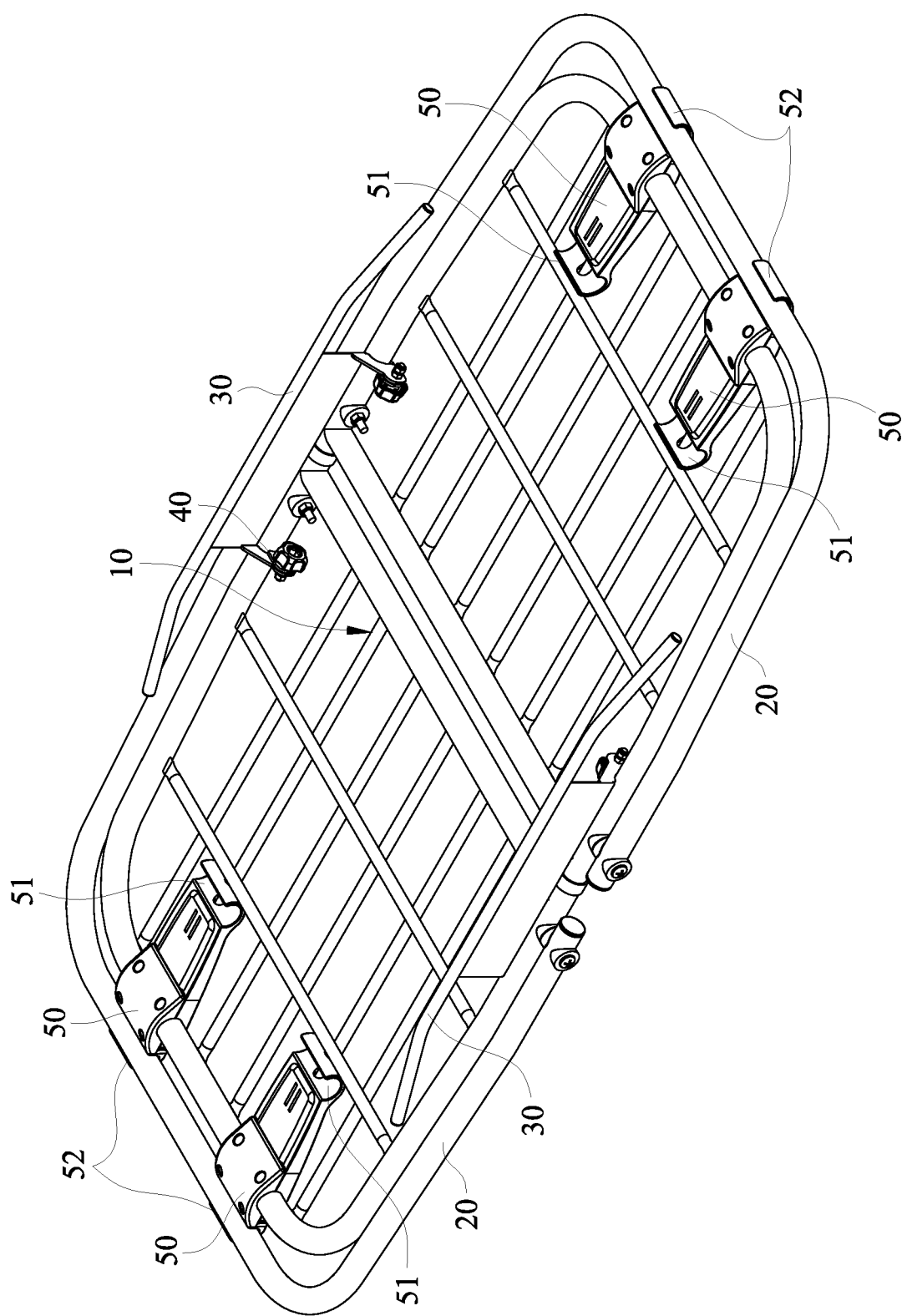
FIG. 4 is a schematic three-dimensional view of the barrier rods being set flat adjacent and fixedly connected to the base panel by at least one second securing clip.

Referring to FIG. 1, FIG. 3 and FIG. 4, the base panel 10 can further comprises plural fixing planks 50, each fixing plank 50 is being rotated raised and fixed on the base panel 10, or being rotated flat and fixed on the base panel 10. A first securing clip 51 is formed on one end of each fixing plank 50, and a second securing clip 52 is formed on the other end of each fixing plank 50.

Further, each said first securing clip 51 or second securing clip 52 can be a C-shaped clip, and the forming material of each fixing plank 50 including the first securing clip 51 and the second securing clip 52 can be one kind or a mixture of polymer materials, composite materials or advanced composite materials, such as PC, PS, or ABS for example.

As shown in FIG. 3, each barrier rod 20 is being firmly fixed by at least one fixing plank 50 with the first securing clip 51 when the barrier rod 20 is being raised above the base panel 10 for object containing and protection.

While as shown in FIG. 4, each barrier rod 20 is being firmly fixed on the base panel 10 by at least one fixing plank 50 with the second securing clip 52 when the barrier rod 20 is being set flat adjacent to the base panel 10.

Figure 7:
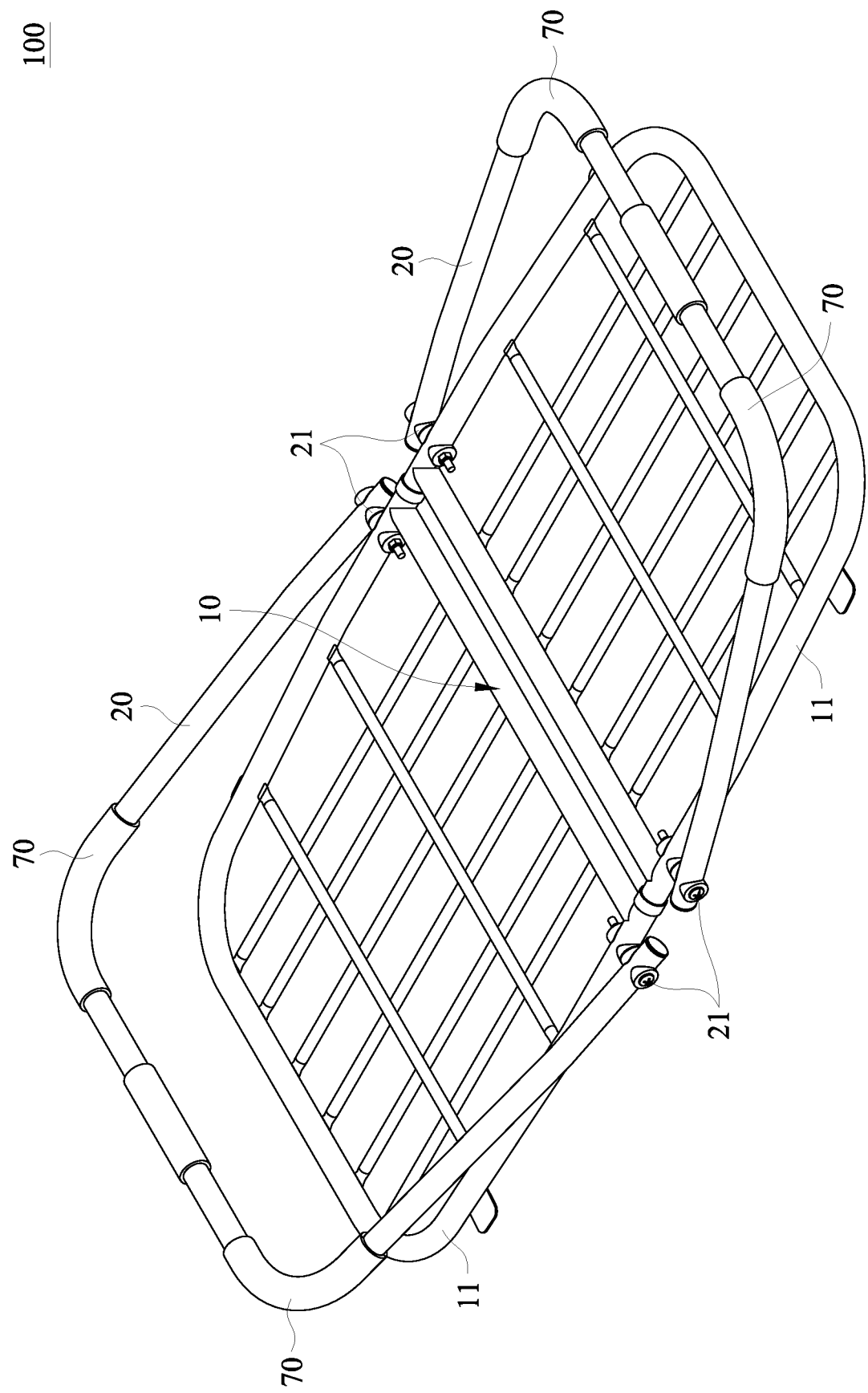
FIG. 7 is a schematic three-dimensional view of at least one sheath is being formed wrapping around each barrier rod according to an embodiment of the present invention.

Then as shown in FIG. 7, at least one sheath 70 can be formed wrapping around each barrier rod 20. The sheath 70 can be a ring-type sheath 70, and on the other hand, the sheath 70 be made of rubber, plastic rubber, foam material or other protection materials for effective and better protecting the containing objects in the roof panel structure 100 from possible collisions or accidental impact.

Figure 8:
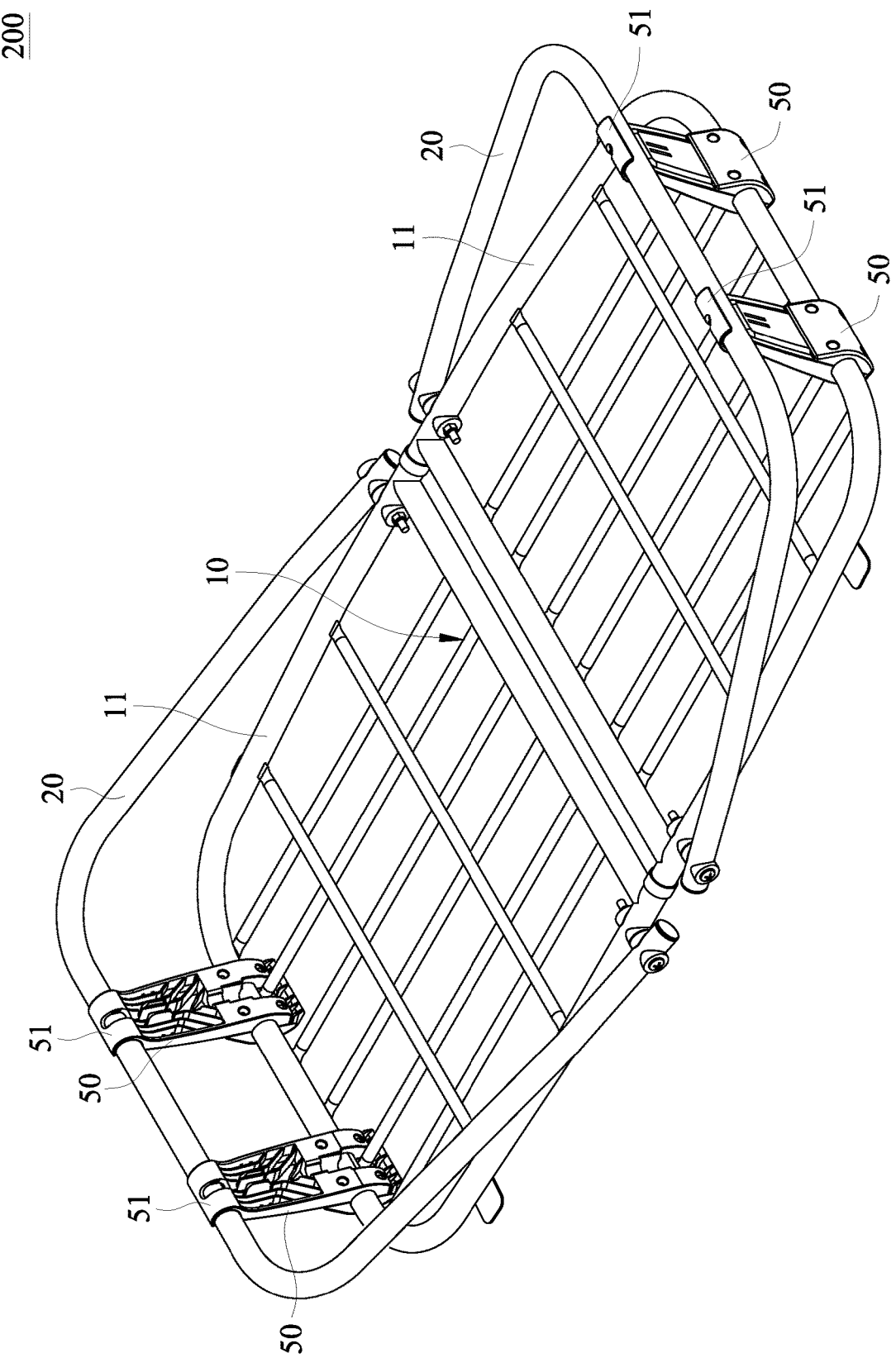
FIG. 8 is a schematic three-dimensional view of another roof panel structure according to an embodiment of the present invention.

Please then refer to FIG. 8, in another embodiment of the present invention, a multipurpose roof panel structure 200 is provided to be used on a car roof to securely contain and protect objects, wherein the roof panel structure 200 includes a base panel 10, two barrier rods 20 and plural fixing planks 50.

As shown in FIG. 8, FIG. 9A, FIG. 9B, FIG. 11A and FIG. 11B, the characteristic features of the base panel 10 and the barrier rods 20 of the roof panel structure 200 are same as the base panel 10 and the barrier rods 20 of the roof panel structure 100 as described above and shown in FIG. 1, FIG. 2A, FIG. 2B, FIG. 5 and FIG. 6, and will not be going into details again.

Figure 9A:
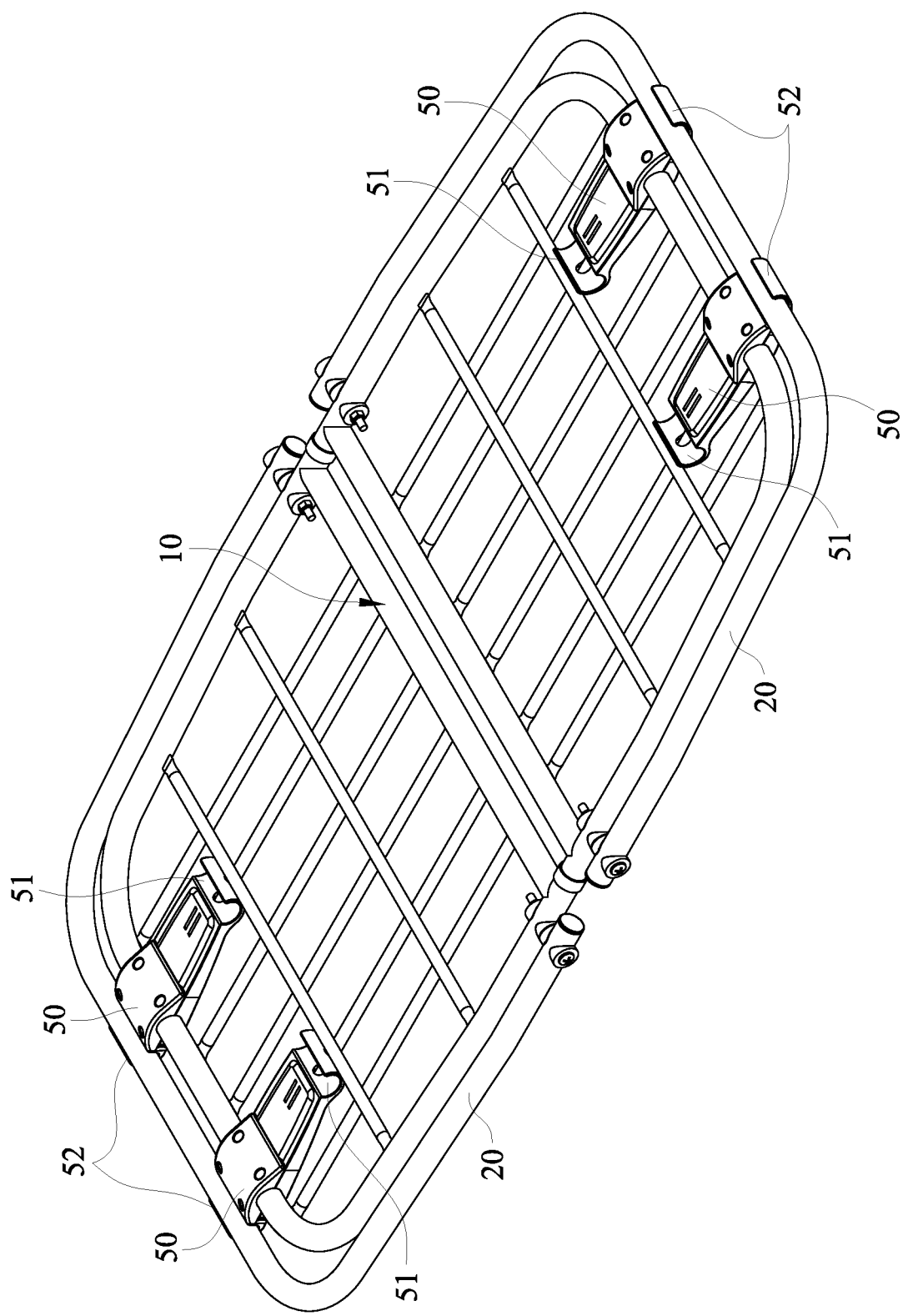
FIG. 9A is a schematic three-dimensional view of each barrier rod is being fixedly connected to the base panel by at least one second securing clip when the barrier rod is set flat adjacent to the base panel according to an embodiment of the present invention.
Figure 9B:
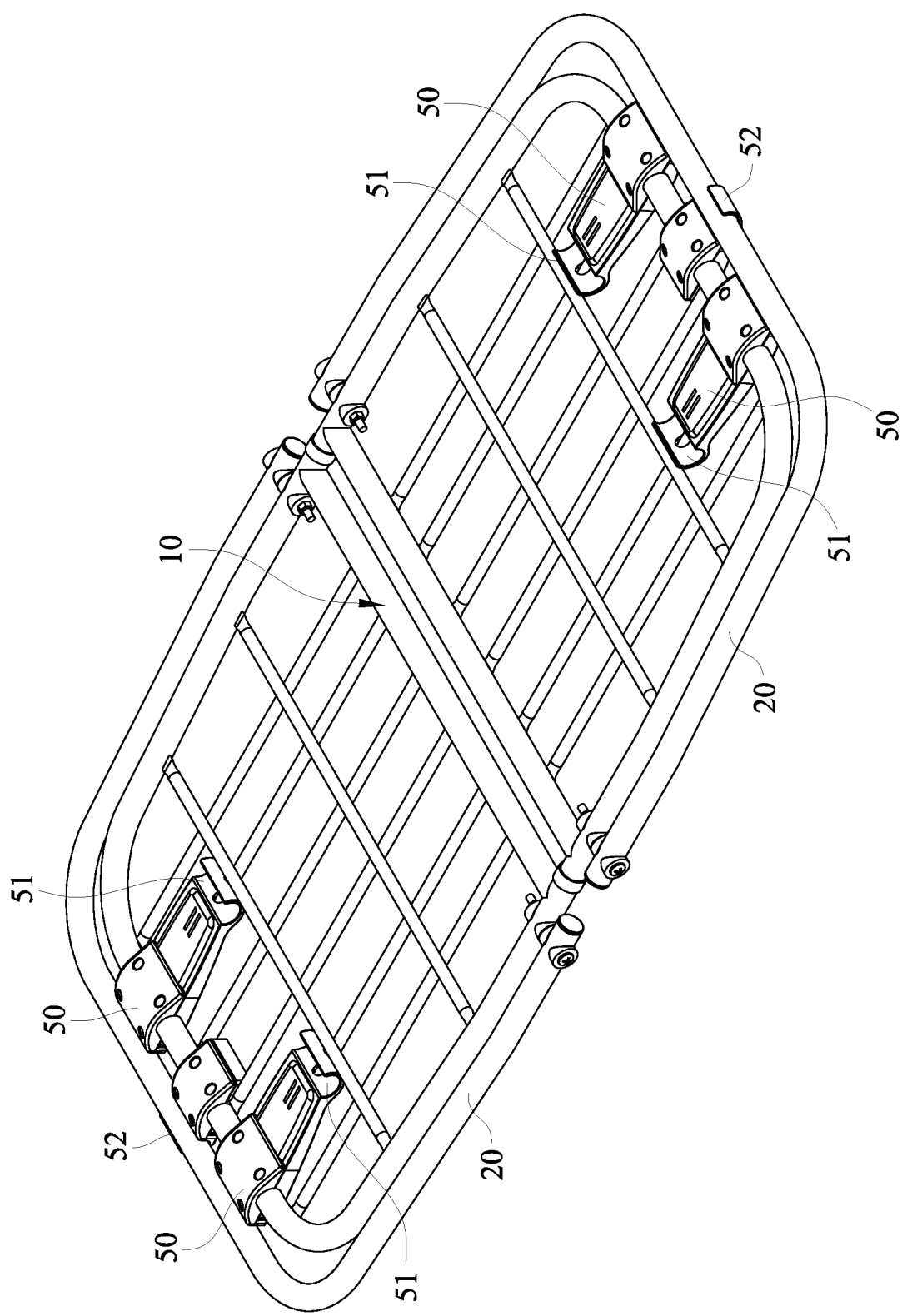
FIG. 9B is another schematic three-dimensional view of each barrier rod is being fixedly connected to the base panel by at least one second securing clip when the barrier rod is set flat adjacent to the base panel according to an embodiment of the present invention.

Referring to FIG. 8, FIG. 9A and FIG. 9B, the roof panel structure 200 includes plural fixing planks 50, each fixing plank 50 being rotated raised and fixed on the base panel 10, or being rotated flat and fixed on the base panel 10. A first securing clip 51 is further formed on one end of each fixing plank 50.

As shown in FIG. 8, each barrier rod 20 is being firmly fixed to the base panel 10 with the first securing clip 51 of at least one fixing plank 50 when the barrier rod 20 is being raised above the base panel 10 for object containing and protection.

While as shown in the embodiments of FIG. 9A and FIG. 9B, each barrier rod 20 is being fixedly connected to the base panel 10 by at least one second securing clip 52 when the barrier rod 20 is being set flat adjacent to the base panel 10.

As shown in FIG. 9A, the second securing clip 52 can be formed on the other end of a fixing plank 50, wherein the other end of a fixing plank 50 means the end other than the one end where the first securing clip 51 being formed on. In some embodiments, both the first securing clip 51 and the second securing clip 52 can be formed in one piece together with the fixing plank 50.

Or, as shown in FIG. 9B, the second securing clip 52 can be formed or fixed on the base panel 10. Each said second securing clip 52 as described above and shown in FIG. 9A or FIG. 9B helps to firmly clip and hold a barrier rod 20 when the barrier rod 20 is set flat adjacent to the base panel 10.

Further, each said first securing clip 51 or second securing clip 52 can be a C-shaped clip, and the forming material of each fixing plank 50, first securing clip 51 or second securing clip 52 can be one kind or a mixture of polymer materials, composite materials or advanced composite materials.

Figure 10A:
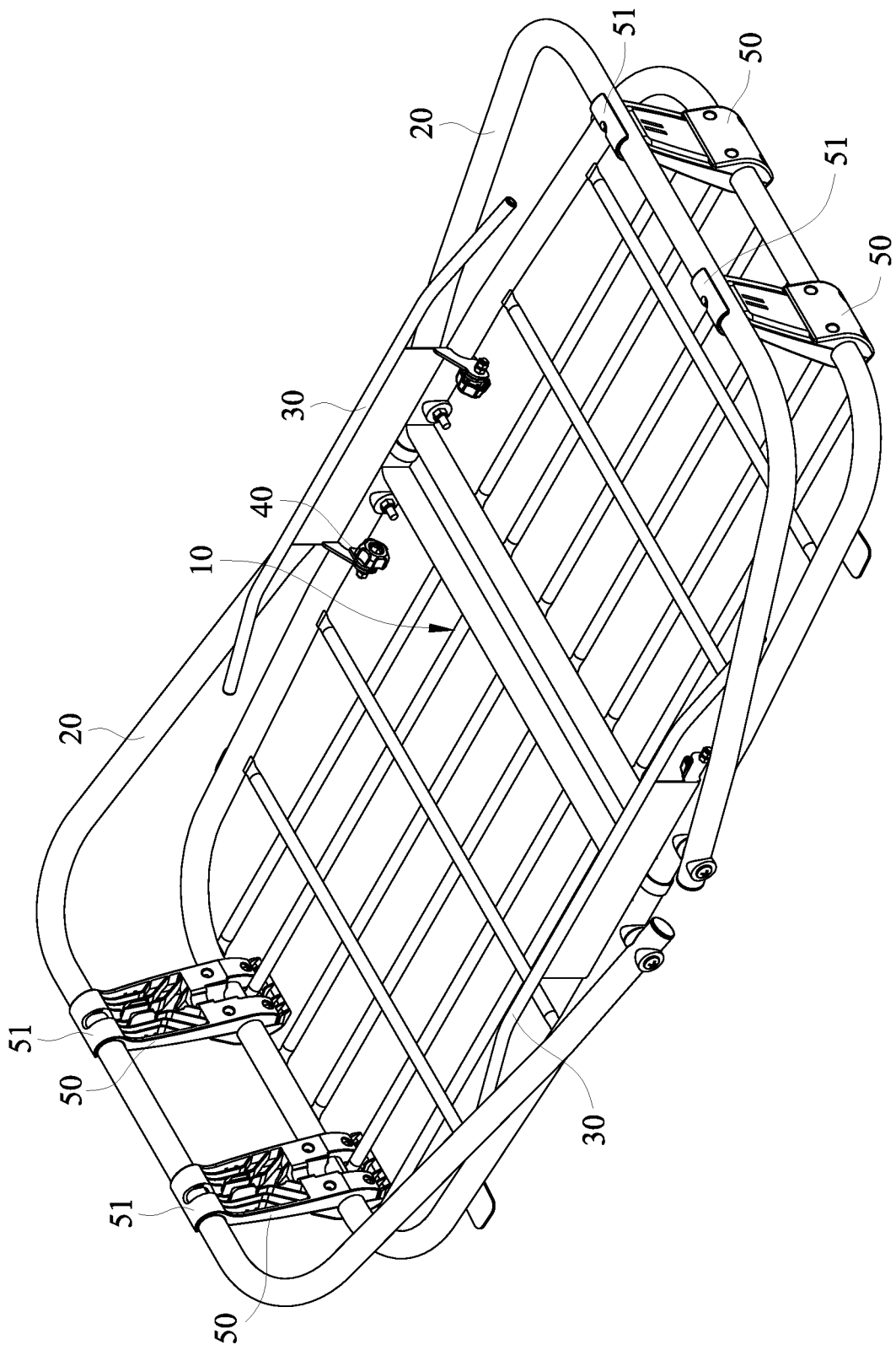
FIG. 10A is a schematic three-dimensional view of a roof panel structure further comprises two barrier bars each being firmly attached to one side of the base panel with a rotation unit according to an embodiment of the present invention.
Figure 10B:
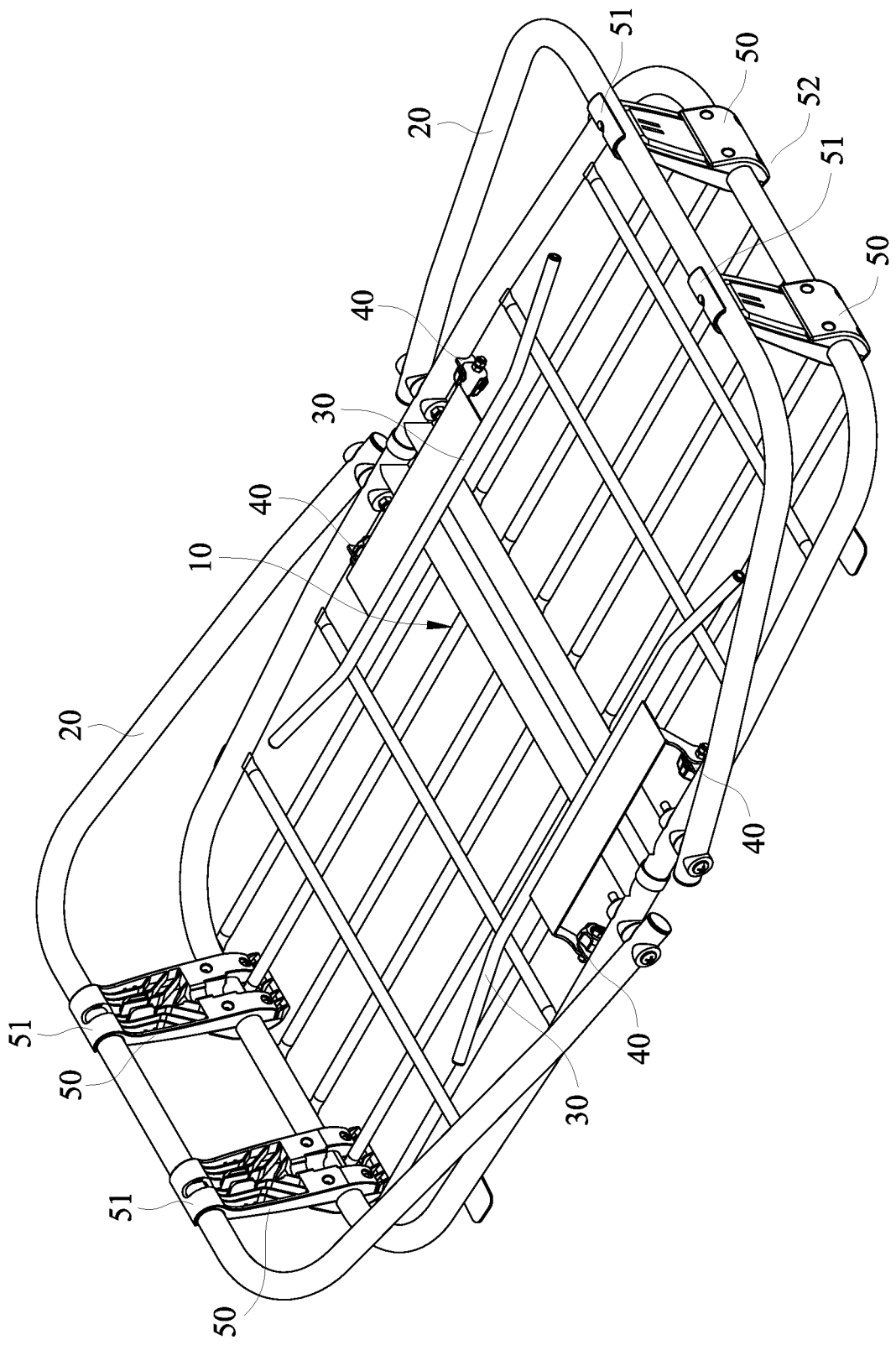
FIG. 10B is another schematic three-dimensional view of a roof panel structure further comprises two barrier bars each being firmly attached to one side of the base panel with a rotation unit according to an embodiment of the present invention.
Figure 11A:
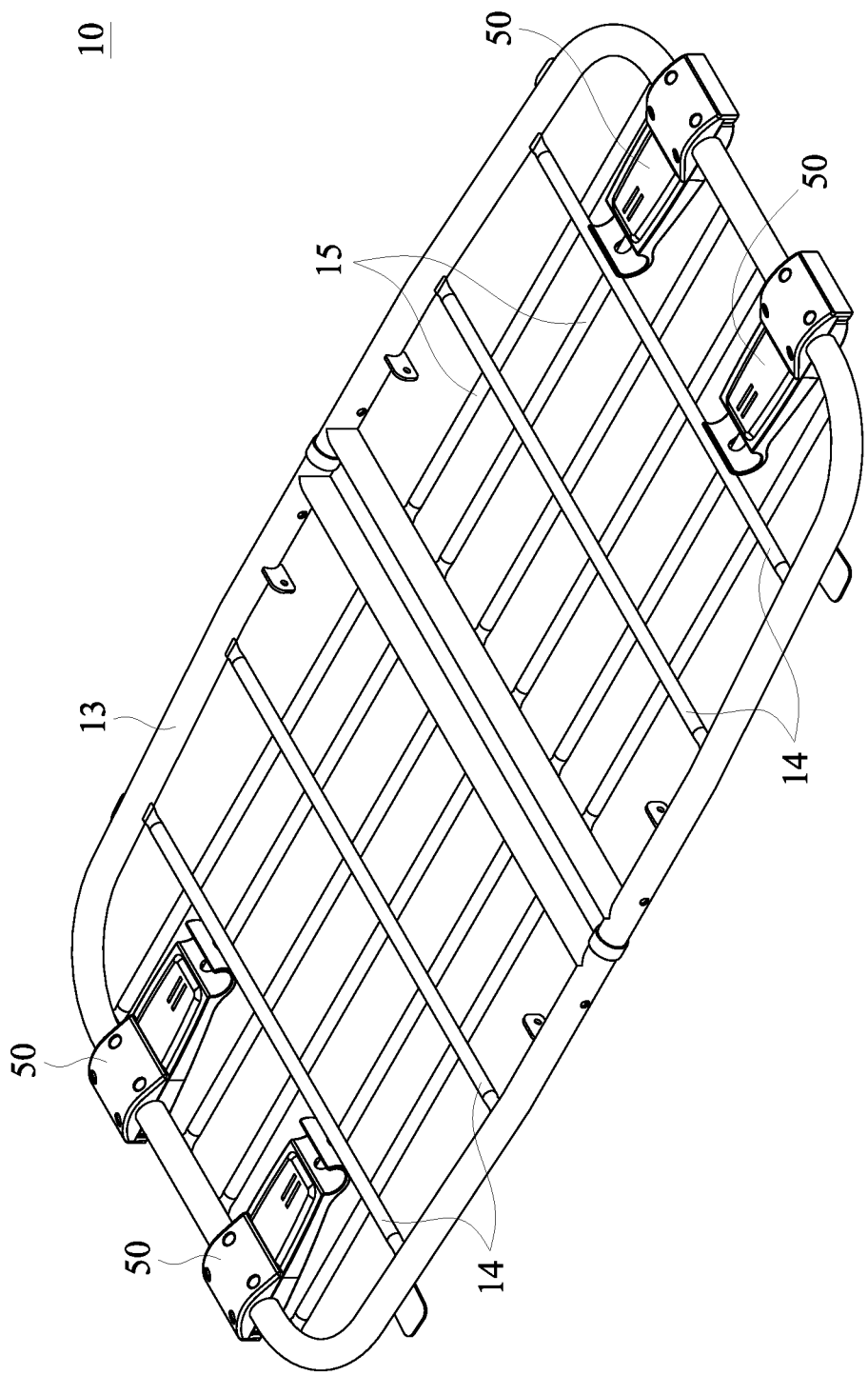
FIG. 11A is a schematic three-dimensional view of a base panel being a frame that is a fixed combination of plural horizontal bars and plural vertical bars according to an embodiment of the present invention.
Figure 11B:
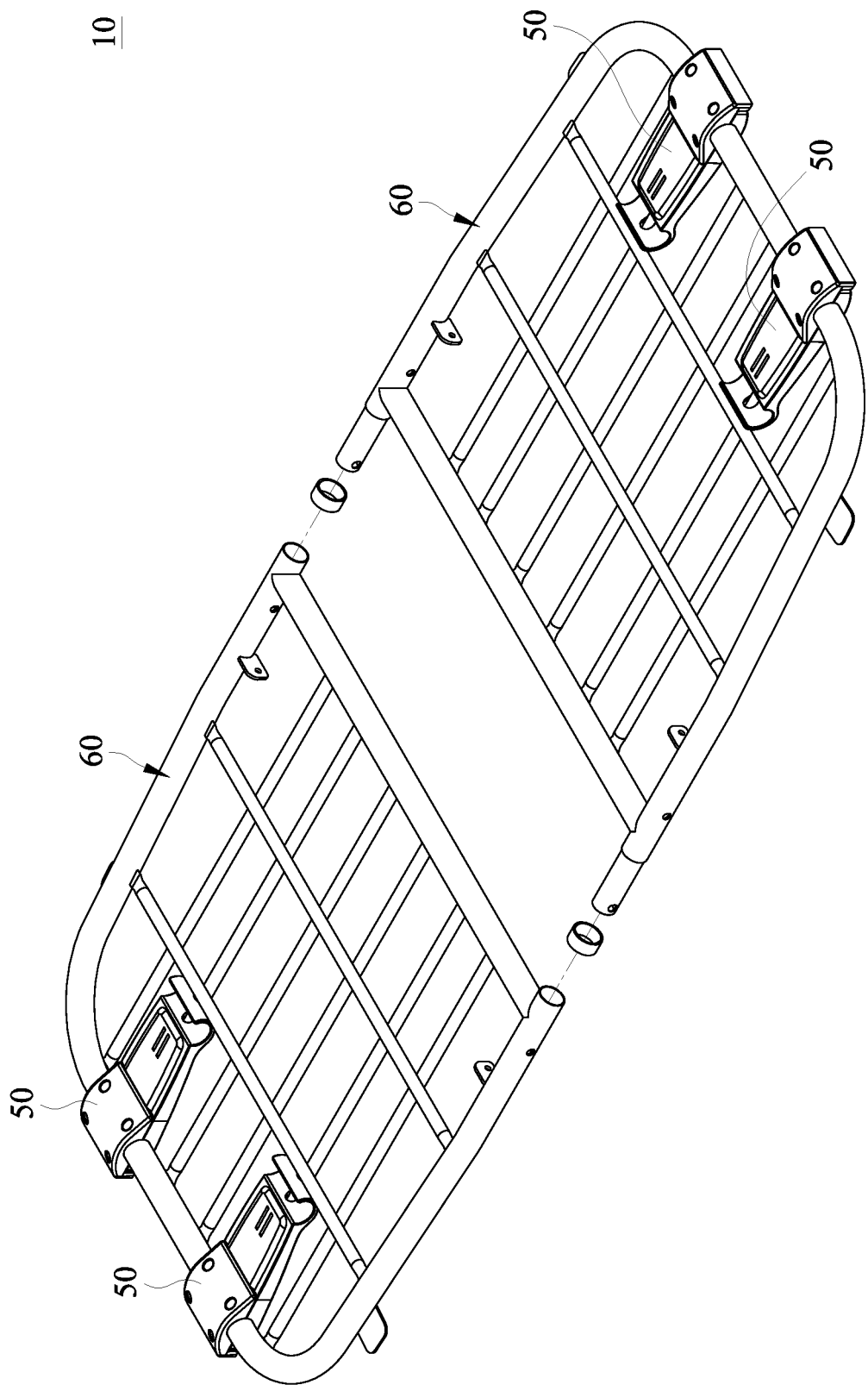
FIG. 11B is a schematic three-dimensional view of a base panel being composed of at least two separate parts according to an embodiment of the present invention.

Please then refer to FIG. 8, FIG. 10A and FIG. 10B, the roof panel structure 200 can further comprise two barrier bars 30 each being firmly attached to one side 11 of the base panel 10 with a rotation unit 40 on the side 11. Being with no limitation to the size or shape, the barrier bars 30 can be arc shape, curved shape, polygonal shape, irregular shape, or other shapes made for various applications, and the forming material of the barrier bars 30 can also be same as the material of the base panel 10 or the barrier rods 20.

As shown in FIG. 10A and FIG. 10B, each barrier bar 30 fixed to the rotation unit 40 can rotate on the rotation unit 40 to either rise on the side 11 or set flat on the base panel 10, wherein the rotation unit 40 can be fixed to the base panel 10 with at least one screw set, by welding or by riveting, and each rotation unit 40 also locks a barrier bar 30 in position with proper automatic locking means, when the barrier bar 30 being either raised on the side 11 or set flat on the base panel 10.

Figure 12:
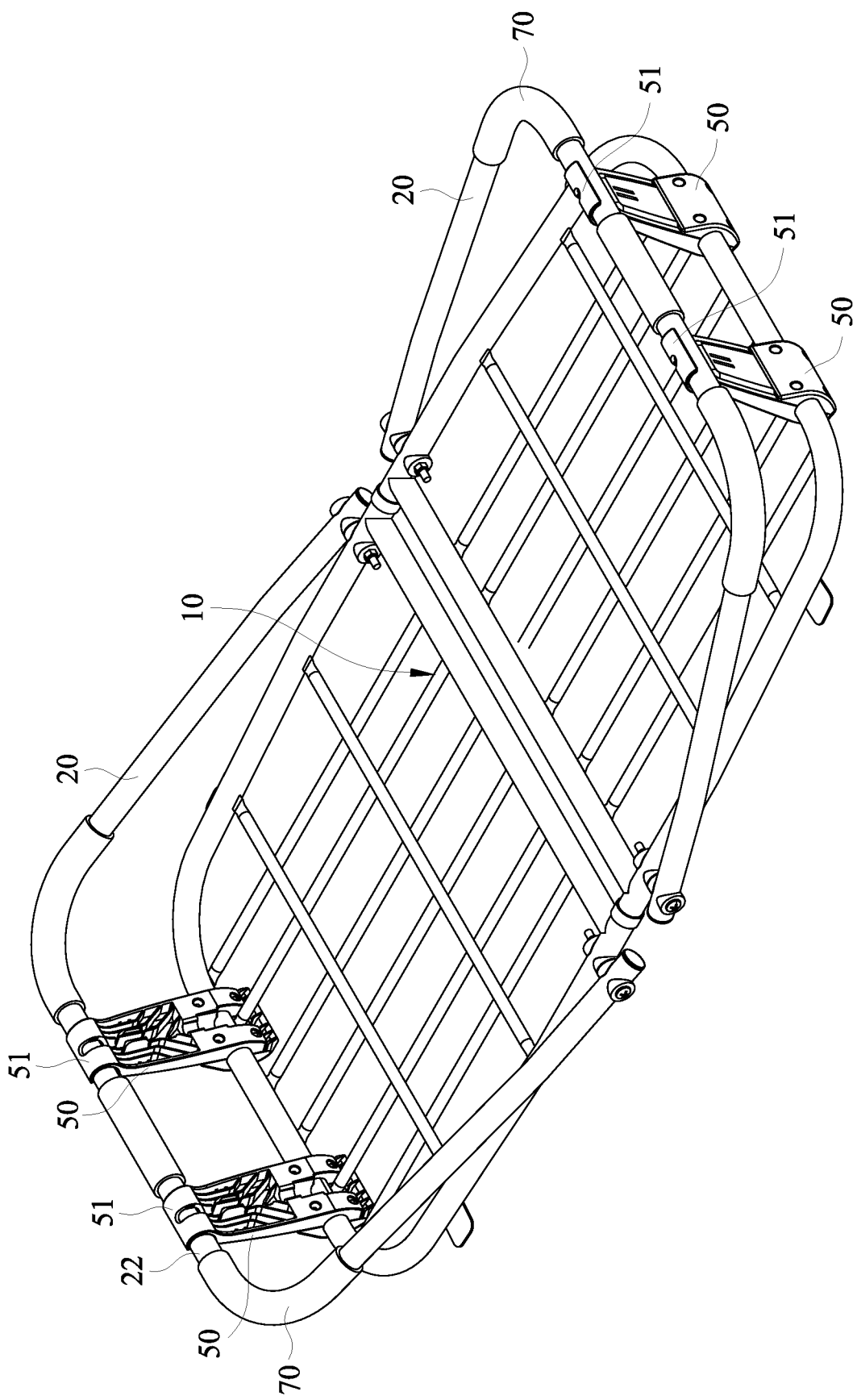
FIG. 12 is a schematic three-dimensional view of at least one sheath is being formed wrapping around each barrier rod according to an embodiment of the present invention.

Then as shown in FIG. 12, at least one sheath 70 can be formed wrapping around each barrier rod 20. Each sheath 70 can be a ring-type sheath 70, and on the other hand, each sheath 70 can be made of rubber, plastic rubber, foam material or other protection materials for effective and better protecting the containing objects in the roof panel structure 200 from possible collisions or accident impact.

In conclusion, multiple improvements as follows, which cannot be achieved by known existing solutions, can be achieved by inclined rising or setting flat the barrier rods 20 of the roof panel structure 100 or the roof panel structure 200 in the present invention: Firstly, bags, luggage or cargos can be securely contained and well protected by the inclined raised barrier rods 20 together with the base panel 10. Secondly, the barrier rods 20 can be set flat adjacent to the base panel 10 to make the roof panel structure 100 or the roof panel structure 200 securely contain and well protect long objects or large size objects such as ski boards or surf boards. And moreover, each barrier rod 20, either raised above or set flat adjacent to the base panel 10, can be firmly fixed by at least one fixing plank 50 to the base panel 10.

The embodiments described above are intended only to demonstrate the technical concept and features of the present invention to enable a person skilled in the art to understand and implement the contents disclosed herein. It is understood that the disclosed embodiments are not to limit the scope of the present invention. Therefore, all equivalent changes or modifications based on the concept of the present invention should be encompassed by the appended claims.

What is claimed is:

1. A multipurpose roof panel structure, made by a rigid material, comprising:
   a base panel ; and
   two barrier rods, wherein one end of each barrier rod is combined separately to the base panel at each side, and wherein the barrier rods are movable barrier rods such that each of the said barrier rods is being inclined raised above the base panel or being set flat resting adjacent to the base panel; further comprising two barrier bars each being firmly attached to one side of the base panel with a rotation unit; wherein each said barrier bar being a curved or arc shape barrier bar; wherein the base panel further comprises plural fixing planks, each fixing plank being rotated raised and fixed on the base panel, or being rotated flat and fixed on the base panel, wherein a first securing clip being formed on one end of each fixing plank and a second securing clip being formed on the other end of each fixing plank; wherein each barrier rod is being firmly fixed by the first securing clip of at least one fixing plank when the barrier rod is being raised above the base panel.

2. The roof panel structure according to claim 1, wherein each barrier rod is being firmly fixed on the base panel by the second securing clip of at least one fixing plank when the barrier rod is being set flat adjacent to the base panel.

3. A multipurpose roof panel structure, made by a rigid material, comprising:
   a base panel;
   two barrier rods, wherein one end of each barrier rod is combined separately to the base panel at each side, and wherein the barrier rods are movable barrier rods that each said barrier rod is being inclined raised above the base panel or being set flat resting adjacent to the base panel; and
   plural fixing planks, each being rotated raised and fixed on the base panel, or being rotated flat and fixed on the base panel, wherein a first securing clip being formed on one end of each fixing plank; wherein each barrier rod is being firmly fixed to the base panel with the first securing clip of at least one fixing plank when the barrier rod is being raised above the base panel.

4. The roof panel structure according to claim 3, wherein each barrier rod is being fixedly connected to the base panel by at least one second securing clip when the barrier rods are being set flat adjacent to the base panel.

5. The roof panel structure according to claim 4, wherein each second securing clip is being formed on the other end of a fixing plank.

6. The roof panel structure according to claim 4, wherein each second securing clip is being formed or fixed on the base panel.

\* \* \* \* \*